United States Patent [19]
Swett

[11] Patent Number: 6,014,911
[45] Date of Patent: Jan. 18, 2000

[54] FLYWHEEL WITH SELF-EXPANDING HUB

[76] Inventor: Dwight W. Swett, 5342 W. 23rd St., Hawthorne, Calif. 90250

[21] Appl. No.: 09/006,475

[22] Filed: Jan. 13, 1998

[51] Int. Cl.[7] ........................................... F16F 15/30
[52] U.S. Cl. ................................................. 74/572
[58] Field of Search ........................ 74/572, 574; 310/74

[56] References Cited

U.S. PATENT DOCUMENTS

| | | |
|---|---|---|
| 4,080,845 | 3/1978 | Hatch ........................................ 74/572 |
| 4,821,599 | 4/1989 | Medlicott ................................. 74/572 |
| 4,991,462 | 2/1991 | Breslich, Jr. et al. .................... 74/572 |
| 5,614,777 | 3/1997 | Bitterly et al. ........................ 74/572 X |
| 5,732,603 | 3/1998 | Swett et al. .............................. 74/572 |
| 5,816,114 | 10/1998 | Gregiore et al. ......................... 74/572 |

FOREIGN PATENT DOCUMENTS

| | | | |
|---|---|---|---|
| 794277 | 1/1981 | U.S.S.R. .................................. 74/572 |
| 973970 | 11/1982 | U.S.S.R. .................................. 74/572 |
| 1257322 | 9/1986 | U.S.S.R. .................................. 74/572 |
| 1270449 | 11/1986 | U.S.S.R. .................................. 74/572 |

*Primary Examiner*—Mary Ann Battista
*Attorney, Agent, or Firm*—Greogory J. Nelson

[57] ABSTRACT

A high energy storage flywheel having a rotor and annular disk which are of a composite material. A metal hub is secured to a shaft and joined to the disk at a hoop. The hub has opposite sections which are of a generally double conical shaft. A concentric rim extends around each hub section and upon rotation the hub sections expansivity deform about the rim to apply a compressive force to the disk to maintain a substantially stress free condition at the rotor and disk interface.

13 Claims, 8 Drawing Sheets

STRESS SUMMARY

| FLYWHEEL COMPONENT | PEAK STRESS PARAMETERS (50 KRPM) | ALLOWABLE STRESS PARAMETER | MARGIN OF SAFETY |
|---|---|---|---|
| COMPOSITE ROTOR (OUTER) | $\sigma_{hoop}$ = 194 ksi | $F_{tu}$ = 310 ksi | +0.60 |
| COMPOSITE ROTOR (INNER) | $\sigma_{hoop}$ = 187 ksi | $F_{tu}$ = 325 ksi | +0.74 |
| INTERFACE DISK | $\sigma_{hoop}$ = 168 ksi | $F_{tu}$ = 380 ksi | +1.26 |
| ROTOR (MATRIX) | $\sigma_{radial}$ = 2.26 ksi | $F_{tu}$ = 5 ksi | +1.21 |
| STEEL HUB (VASCOMAX C-300) | $\sigma_{vonMises}$ = 232 ksi $\varepsilon_{elastic}$ = 0.88% | $F_{tu}$ = 300 ksi $\varepsilon_{ult}$ = 6% | > +0.50 |

FLYWHEEL WITH SELF-EXPANDING HUB

BACKGROUND OF THE INVENTION

1. Field of the Invention

The present invention relates generally to energy storage devices and more particularly to a high energy flywheel design.

2. Description of the Prior Art

The use of flywheels for high energy storage in such applications as hybrid electric vehicles, earth orbiting satellites, military weapons, power utilities, load leveling, space stations and uninterruptable power supplies for computer facilities and electronic manufacturing has long been recognized and new applications are being realized every day. Many of these new applications require greater energy storage capacity and higher energy density (the ratio of the energy stored in a device to the device weight) than is currently available. Flywheel developers have been unable to produce a high energy storing flywheel that is small and light enough to satisfy the demands of the highest potential markets because of the stresses encountered at high speeds. For example, NASA and DOD projects as well as hybrid vehicle applications require a very light weight and very small flywheel.

Because the kinetic energy of a rotating body is equal to $0.5I\omega^2$ (in which I is the body's moment of inertia and ($\omega$) is the angular velocity), efforts to increase the stored energy and energy density of flywheels have concentrated on increasing the angular velocity. However, as angular velocity increases, radial expansion in the flywheel components also increases. Because the components expand at different rates, stress is placed on the component interfaces, as for example between the hub and rotor or rim. In addition, flywheel imbalances, caused by component misalignment and eccentricity, can attenuate potentially destructive resonances and place high loads on components such as shaft bearings.

Attempts to improve the integrity of component interfaces have focused on increasing the stiffness or strength of the attachment mechanism by such expedients as adding mechanical fasteners, increasing the size of component cross sections and incorporating compression pre-loads.

Some flywheel designers have included compliant structures. U.S. Pat. No. 5,124,605 addresses the need for the rim and hub to grow equally in order to eliminate the transfer of outer radial stresses to the hub axis. This is because the inner and outer surfaces of the rim expand outwardly during high speed rotation, the hub must expand at least as rapidly.

The '605 patent suggests that this can be accomplished if the modulus of elasticity of the hub is less than that of the rim. In the patent, a plurality of tube assemblies are positioned coupling the hub and rim. The tube assemblies are pre-compressed or pre-loaded within the flywheel but are purported to maintain dynamic stability at high rotational velocities.

U.S. Pat. No. 4,821,599 couples a rim to a central portion which includes at least one substantially circular, dished member. The dished member is curved such that increasing rotational speed tends to elastically deform the dish member, thereby straightening the curve and increasing the diameter of the dish member. Preferably the dish member includes three integrally formed annular portions of which at least two are curved and positioned on each side of the third portion. In a preferred embodiment the central portion comprises at least two coaxial dished members.

U.S. Pat. No. 4,058,024 discloses an inertial energy rotor having a plurality of independent concentric rotor rings rotatable about a vertical axis. A spacer ring connects each outer rotor ring to its adjacent inner rotor ring and is constructed of substantially rigid material. A spacer ring has a cylindrical configuration and a plurality of slots which alternately extend from opposing axial ends of the ring toward the opposite end of the ring.

U.S. Pat. No. 4,991,462 shows an ultracentrifuge rotor with a hub having radially outwardly extending curved spokes. The outer ends of the spokes are received in a groove defined on the inner peripheral surface of an annular rim. As the rotor rotates, the disparity in physical properties between the hub and the rim as well as the flattening of the curvature of the spokes causes the hub to grow to an extent at least equal to that of the growth of the rim.

U.S. Pat. No. 5,566,588 discloses a flywheel energy storage system having a flywheel rotor which provides high energy storage capacity and has an outer, primarily cylindrical body having conically tapered end sections, a conical hub section attached to the outer body and a relatively short inner cylinder. The cylinder connects the shaft to the inner portion of the conical hub section. In the preferred embodiment, the individual components are predominantly fabricated from filament wound fiber composites which allow material choices. The inner portion of the inner cylinder can be a slotted aluminum cylinder. Thus, this patent teaches a rotor including a cylindrical outer portion for storing most of the energy and a hub portion attaching the outer portion to the shaft. In the exemplary case, the hub portion includes a thin wall conical member which can be attached to the outer cylinder portion at the outer extremity of the hub portion and an inner cylindrical member of relatively short axial extent upon which the conical member is wound.

My prior co-pending application, Ser. No. 08/612,711, now U.S. Pat. No. 5,732,603 discloses a flywheel hub which includes an annular hoop and a pair of compliant diaphragms which are connected to the hoop. The diaphragms have apertures which receive a flywheel shaft and the hoop is sized to receive an annular rim. The diaphragms achieve compliance principally with a serpentine, radial cross section. The hub is preferably fabricated of a fiber and matrix composite. Because the compliant hub tends to match the radial expansion of the adjoining flywheel components, the integrity between the components is enhanced. In addition, the hub permits the rim to position its center of mass on the rotational axis to reduce rim vibrations. Axial spacing of the diaphragms provides moment stiffness to limit and control the rim deflection caused, by for example, gyroscopic precession forces.

Some single core design hubs can be found but are deficient in that they exhibit axial motions parallel to the shaft that are much larger in magnitude than the expansion matching achieved by the design.

As a result, conical disks have not been widely utilized in high speed flywheel designs. Alternatively, axially stable "flexure" hub approaches achieve expansion matching through intrinsic "stretch" of the designs, but always at the sacrifice of stiffness necessary that would promote rotordynamic stability. This high flexibility coupled with the low mass of flexure hub approaches make these design approaches incapable of producing "compression locking" at the hub to rotor interface. Consequently, these design approaches fail to address the catastrophic radial tensile stresses that are the limiting feature of all filament wound composite rotor designs.

SUMMARY OF THE INVENTION

The present invention is directed to a flywheel which is capable of storing large amounts of energy and achieving high energy density as for example as much as 140 watt hour/kilogram. The flywheel of the present invention can operate at high rotational velocities and has a pair of expandable hubs having a double cone configuration which tend to over compensate radial expansion of the adjoining flywheel components which produces a self-locking compression joint at the hub to rotor interface. The flywheel is self-balancing and reduces the rotor radial tensile stresses and rotational instability found in prior art designs. The design utilizes a rotor of high strength graphite or other composite material that is wound much like the spool of a thread and, accordingly, can withstand very high stress levels without failing. Though graphite composite flywheels have high strength, even higher than the most sophisticated high alloy steels, the composite matrix that binds the fibers together is relatively weak. Accordingly, as the flywheel spins at very high speeds, the composite matrix material tends to pull apart at the attachment to the hub. This destroys the flywheel before the flywheel can reach high speeds. The self-expanding hub of the present invention is based upon an engineering analysis and directed at preventing the fiber matrix from pulling apart when the flywheel rotates at high velocities.

Accordingly, a high energy density flywheel is achieved with a hub which includes a pair of hub halves which are joined together and extend about a shaft and are attached to a composite interface disk which, in turn, is attached to a filament wound composite rotor. The composite rotor and disk contribute to the low weight of the flywheel assembly. The hub halves are identical and each has a central aperture which receives the shaft. Diverging radially outward from the shaft is a first wall which in the preferred embodiment forms an angle of approximately 20° to 60° with respect to the shaft centerline. The first wall extends to a rim at an intermediate location between the shaft and rotor. The edge of the rim is a generally tubular configuration in the preferred embodiment and the rim is annular extending concentrically about the shaft. Extending from the rim radially inward is a second wall which flattens at its extremity and terminates at an annular hoop.

The identical hub halves are preferably fabricated from a high quality steel and are welded together. The annular hoop is attached to the interface disk by an appropriate bonding technique. As the flywheel rotates, the hub surfaces flex to create a compression at the composite rotor which prevents the matrix material of the rotor from pulling apart. The hub design, for purposes of this application, is termed a "double cone" construction.

The above and other objects and advantages of the present invention will be more fully understood from the following description, claims and drawings in which:

BRIEF DESCRIPTION OF THE DRAWINGS

FIG. 1 is a perspective view, partly broken away of the flywheel assembly;

FIG. 2 is a cross sectional view taken along line 2—2 of FIG. 1 showing the construction of the flywheel hub of the present invention;

FIG. 3 is a perspective view, partly cut away, of the flywheel hub in accordance with the present invention;

FIG. 4 is a diagram illustrating the hub both in its non-deformed, at rest position and the deformed or expanded position which occurs at operating speeds;

FIG. 5 is a diagram which illustrates the stresses occurring at different radial locations within the flywheel during operation;

FIG. 6 shows an alternate embodiment utilizing multiple hubs with a single rotor;

FIG. 7 is a table showing a stress summary for a prototype flywheel; and

FIG. 8 is a graph on a log scale which shows the self-balancing characteristics of the flexible hub of the invention versus a conventional rigid hub.

DETAILED DESCRIPTION OF THE DRAWINGS

Figure 01:
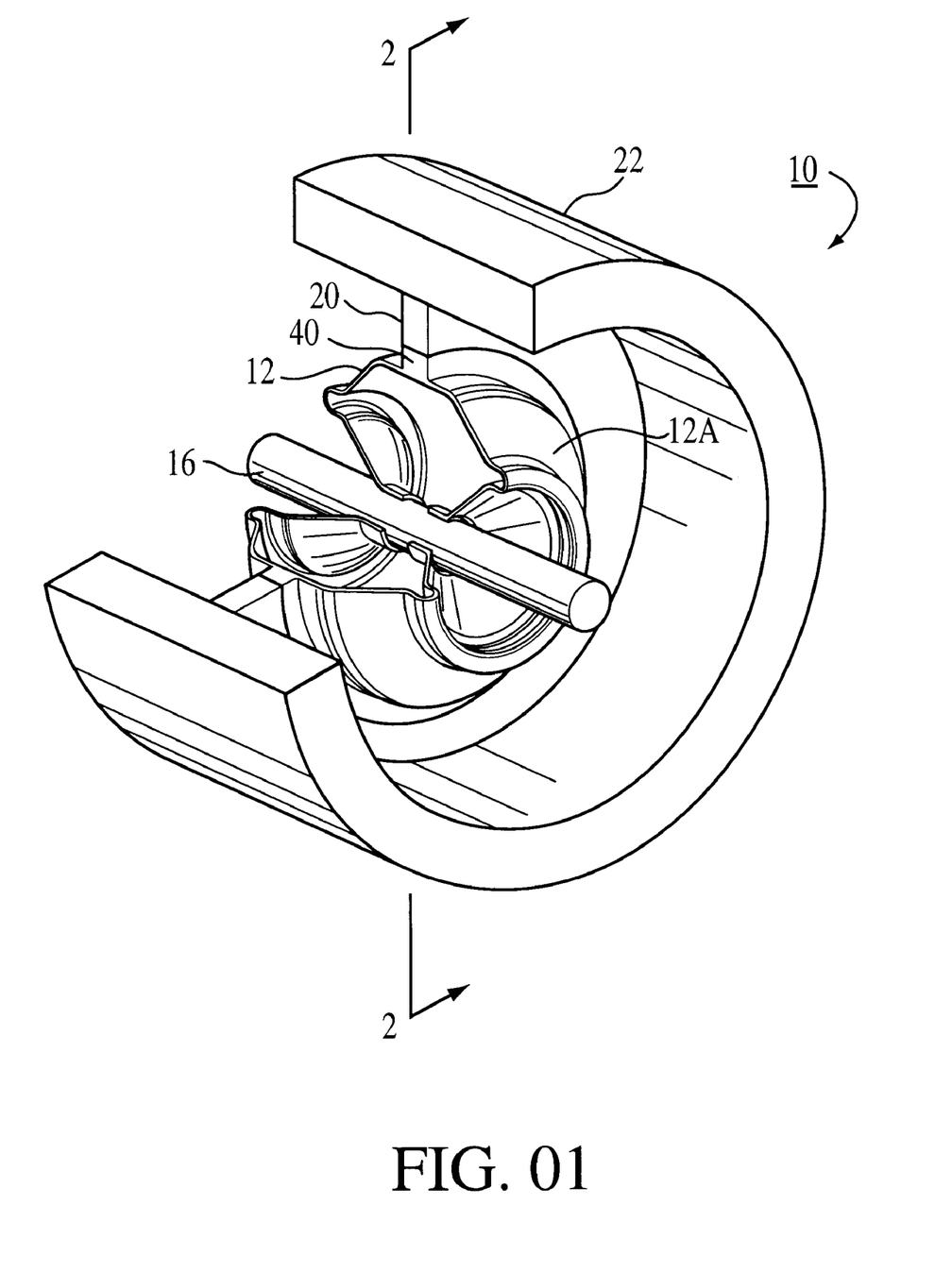
Figure 02:
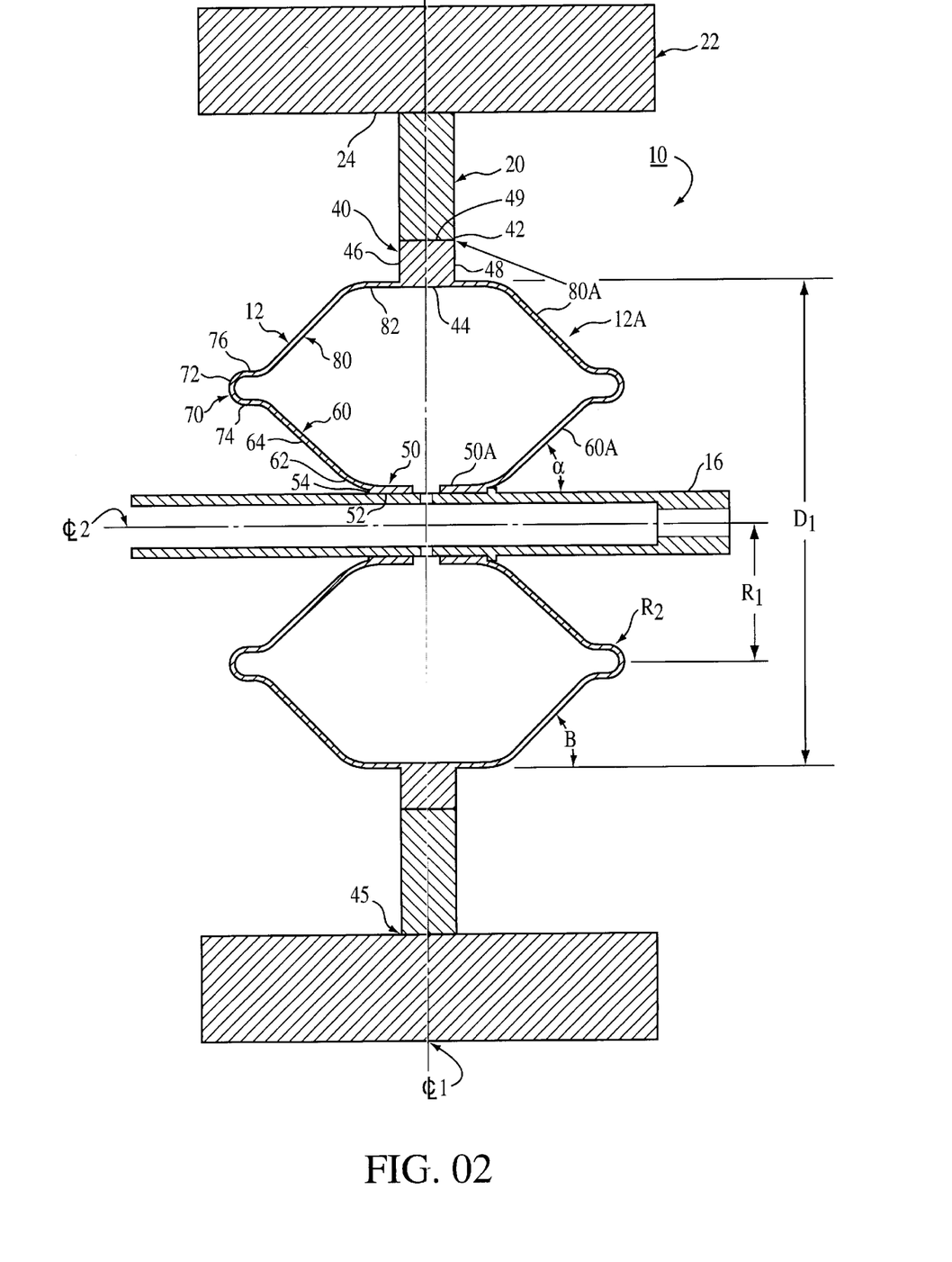
Figure 03:
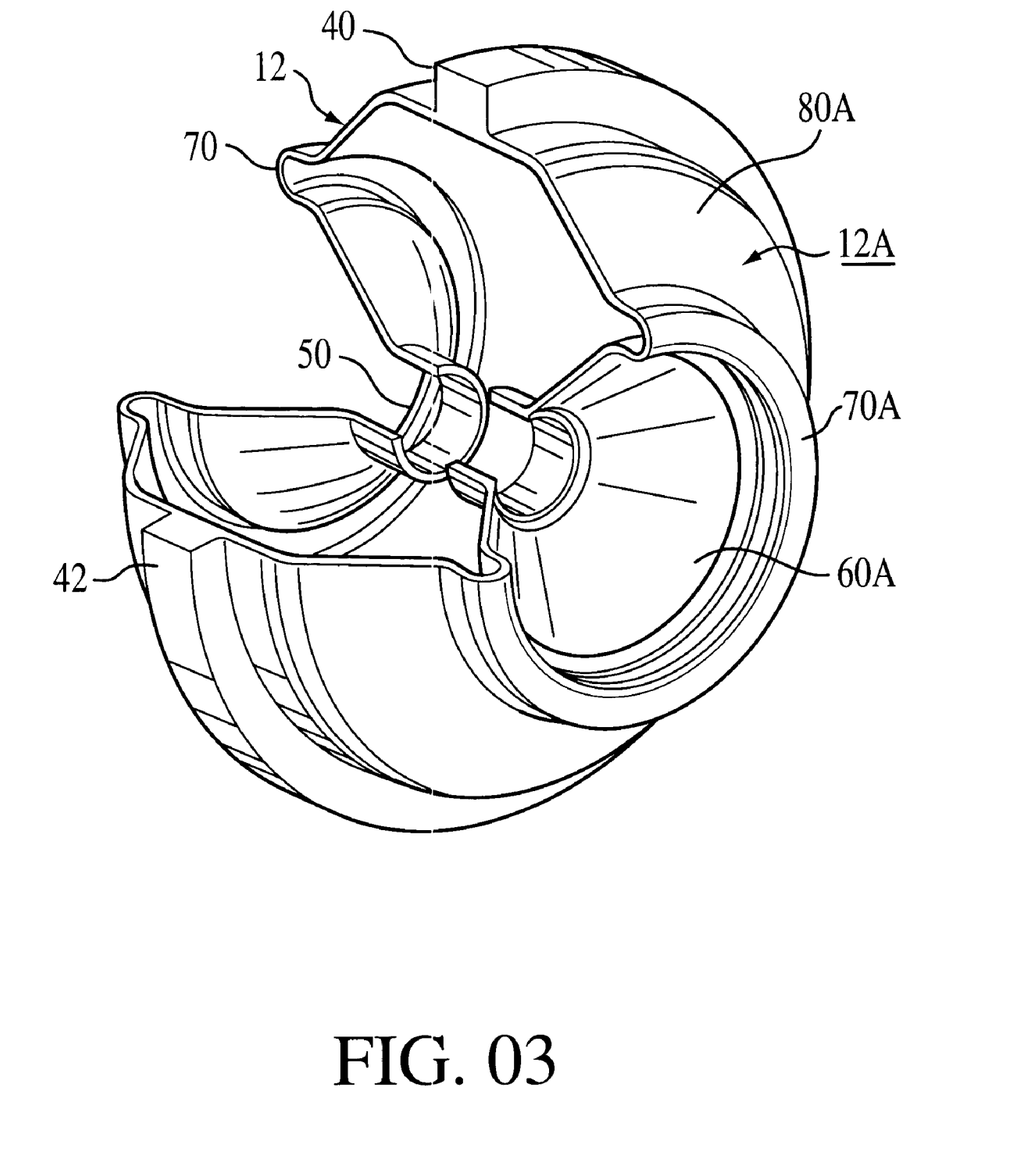

FIGS. 1, 2 and 3 show a preferred embodiment of the flywheel of the present invention which is generally designated by the numeral 10. The flywheel assembly generally consists of a hub comprised of opposed hub sections 12 and 12A, a circumferentially extending interface disk 20 and an outer rotor 22. The outer rotor 22 has a generally rectangular cross section and preferably is a filament wound composite construction such as a graphite composite material. Similarly, the interface disk 20 is a composite filament wound material which has an outer circumferential surface 45 which interfaces with the inner surface 24 of the rotor and is bonded to the rotor. The preferred manufacturing technique for the composite rotor as well as the interface disk includes filament winding using "tow-preg" yarn of graphite fiber sized (or coated) with epoxy resin. This method of fabrication is preferential because of the high degree of control of concentricity and uniformity available with computer controlled spooling machines. An alternative method is a simple hand lay-up using a hand rolling tape machine. This process utilizes "prepreg" tape comprised of very thin (0.0035") plies or sheets of unidirectional fibers impregnated with epoxy resin. This is not the preferred method of fabrication due to the lack of precision control on uniformity and concentricity. It is preferred the disk 20 be circumferentially wound with intermittent axial plies to permit flex and to prevent splitting as a result of the high compression loading. The thickness of the disk is sufficient to resist torque loads imposed by the application environment.

Referring to FIGS. 1 and 2, the hub sections 12 and 12A are joined together along vertical center line CL1 to form a hub structure and each hub section or half has a generally double cone construction. The hub structure supports the rotor for rotation about shaft 16. Shaft 16 has an axial center line CL2.

Each of the hub sections 12 and 12A are identical which greatly facilitates economy and convenience of manufacture. Looking, for example, at hub section 12, the hub includes an annular hoop 40 which is shown as being generally rectangular in cross section having an outer surface 42 and an inner surface 44 and opposite side walls 46 and 48. Side wall 48 is adapted to be joined to side wall 48A of adjacent hub section 12A by electron welding or an adhesive bonding technique using a commercial epoxy. Outer hoop surface 42 is concentric about the shaft and interfaces with the inner surface 49 of composite disk 20.

Concentrically arranged and spaced inwardly from the hoop is a ring 50 which is shown as being a generally thin cylinder. The ring 50 has an inner cylindrical surface 52 which receives the axial shaft 16. The cylindrical portion 52 facilitates the hub-to-shaft interface connection. Section 12A includes a similar ring 50A which is axially spaced from ring 50.

The structure of each hub section further includes a first wall 60 which at its inner end is attached to the outer edge 54 of ring 50. Arcuate transition wall 62 connects to radially diverging section 64 to join an annular rim 70 which, as will be explained, operates as a hinge or flex tube. The annular rim 70 is generally concentrically arranged about the shaft axis CL2 and has a tubular or semi-circular configuration having an arcuate outer edge 72. Wall section 74 connects with wall section 60 and an upper wall section 76 adjoins hub wall section 80 which is generally flat and extends upwardly and converges inwardly to transition wall section 82 which is secured to the inner surface 44 of the annular hoop section 40. Preferably the wall sections 60 and 80, disk 50 and the circumferentially extending rim 70 are all integrally formed as a single fabrication and then joined to the shaft 16 by conventional methods such as bonding or shrink fitting. Each hub section has a generally double cone construction with walls 80, 80A and 60. 60A defining generally conical shapes.

A preferred hub material is a 300 maraging steel having a composition approximately 5% molybdenum, 10% cobalt, 19% nickel and less than or at least 1% chromium. The hub halves, after welding as by electron beam welding, are preferably heat treated yielding an ultimate strength of approximately 300 ksi, yield strength of approximately 290 ksi, elongation of approximately 8%–9%, Rockwell C hardness of 54 and a reduction of area of approximately 25%–50%.

The resulting hub design, based upon engineering analysis and computer simulation, does not allow the fiber matrix of the rotor to pull apart when the flywheel spins at very high speeds. The hub design creates a large compression at the interface of the composite rotor 22 and the disk 20 that keeps the rotor matrix material from pulling apart. Computer simulations indicate that the compression in the matrix continues to increase even as the flywheel increases in speed, virtually assuring that the matrix cannot pull apart even at extremely high speeds. This allows flywheels of the present design to store more energy for a given weight and size than other available flywheels.

Figure 04:
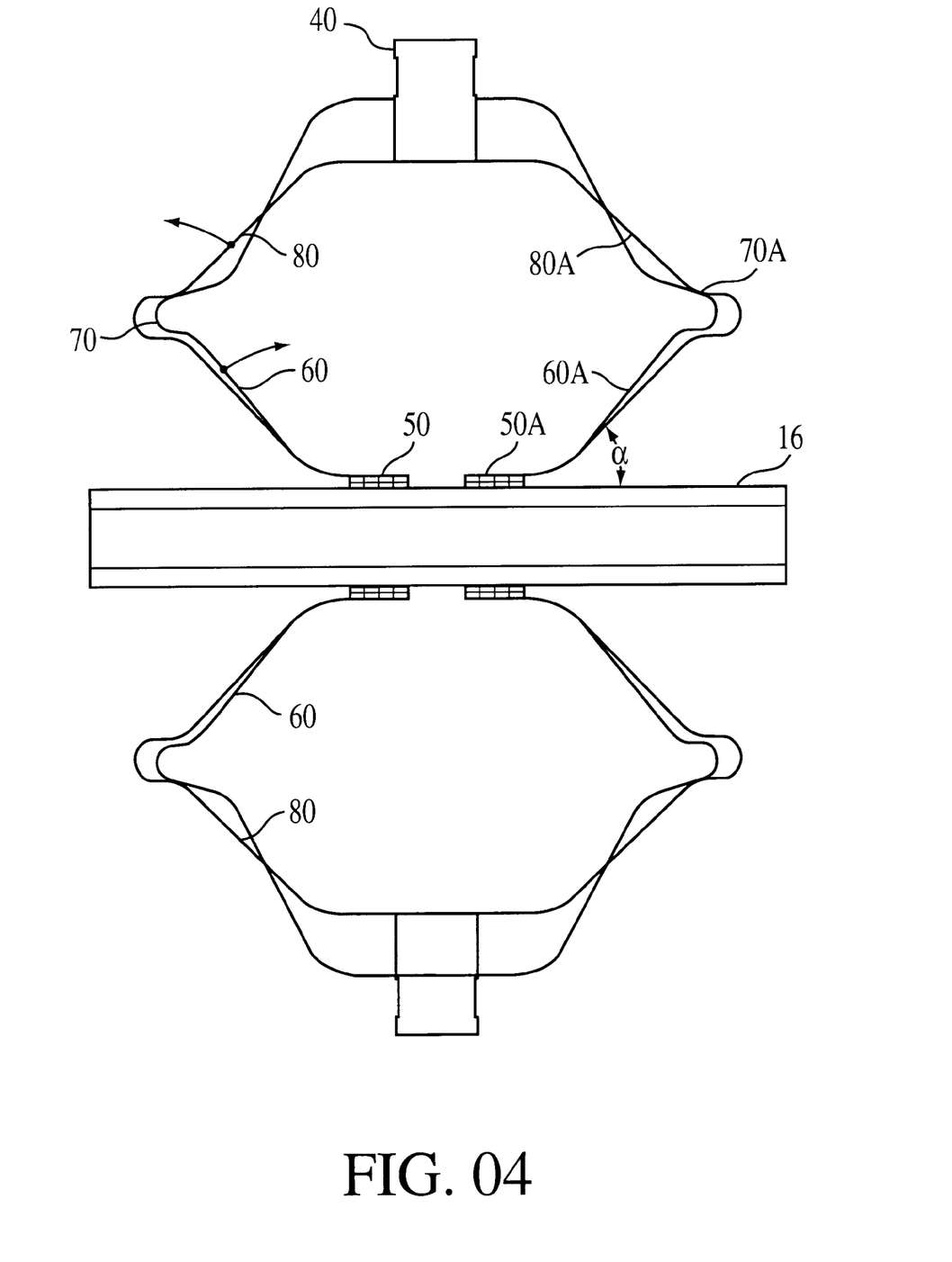
Figure 05:
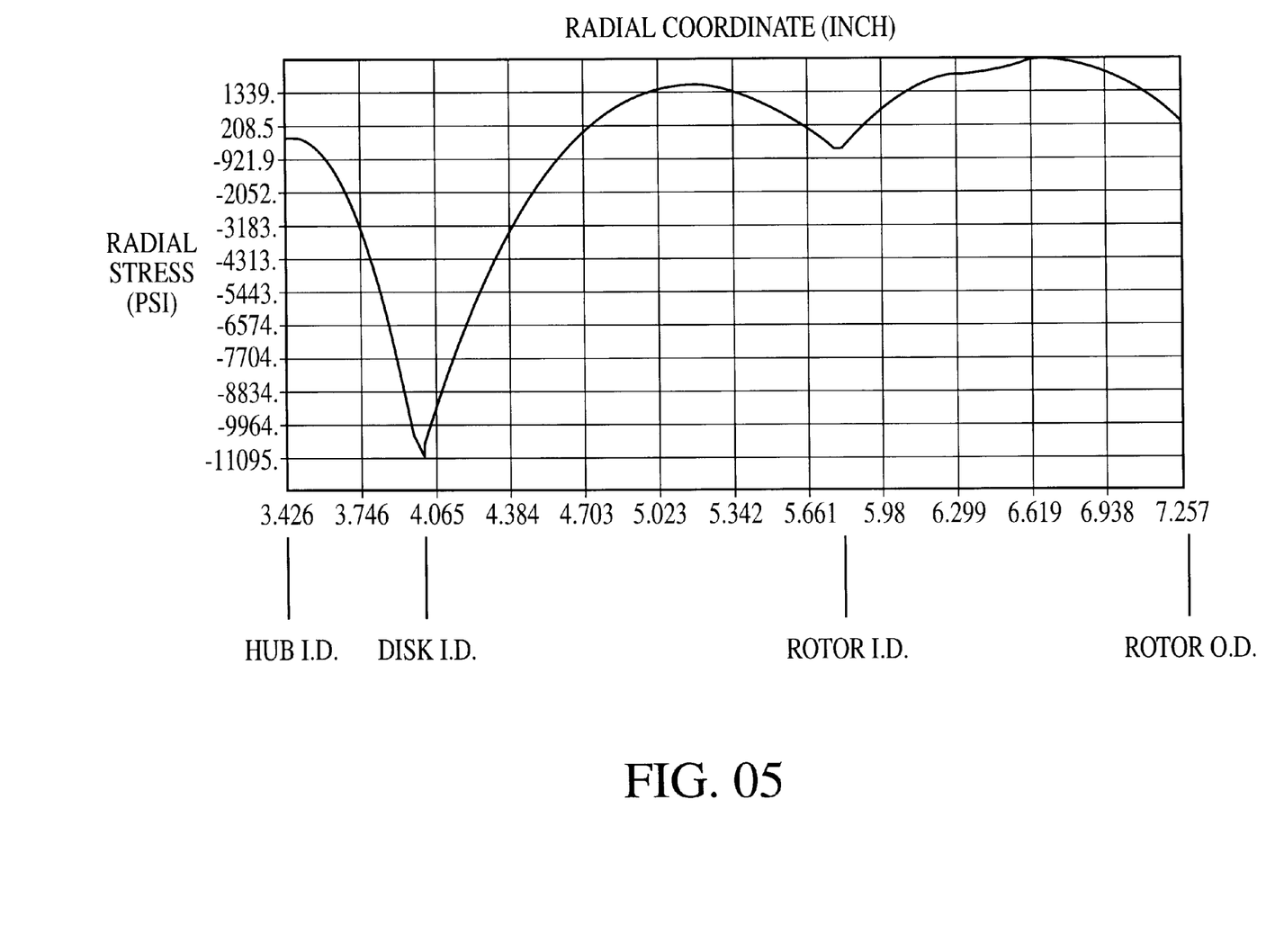
Figure 08:
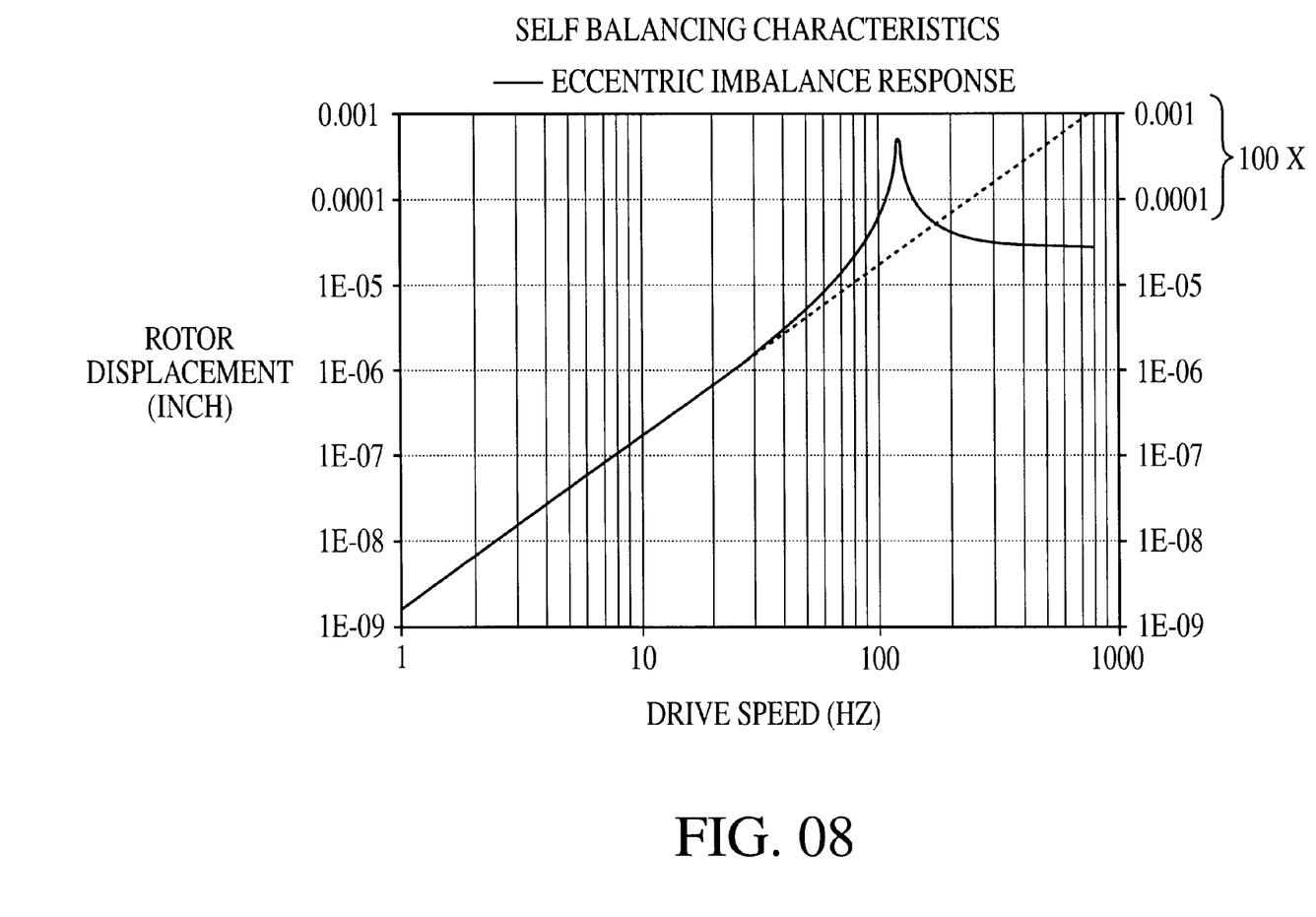

The stress diagram of FIG. 5 illustrates the distribution stresses at various locations within the flywheel and shows the degradation to a virtually stress free interface at the disk/rotor interface. This characteristic allows for high rotational speeds and permits a simple bonded fabrication process at all composite interface joints. FIG. 4 represents the deformation or expansion of the flywheel in operation and FIG. 8 shows the rotordynamic stability characteristics. When the flywheel approaches its critical resonance, substantially below the operational frequency range, the compliance or expansion of the hub allows the rim to position its center of mass on the axis of the shaft. That is, the hub facilitates self balancing of the flywheel. This reduces vibration in the rotor which, in turn, reduces the reaction loadings which impair operational life such as shaft bearing wear and hub fatigue. In the absence of a self-balancing feature, the imbalance of mass can excite vibrational modes to destructive amplitudes as shown in FIG. 8.

An important feature of the present invention is that the expanding hub reduces tensile stress coupling between the flywheel components. The metal hub expands due to centrifugal loading. A radial compression at the composite disk inner-diameter is created by the hub expansion and propagates through the disk to create an effectively stress free interface between the interface disk and the composite rotor.

Referring to FIGS. 1 and 4, at operational speeds, wall 60 will tend to flatten inwardly as indicated by the arrows. The outer conical wall 80 will also tend to flatten but will tend to flatten to a greater degree and will flatten or move outwardly. The result is an expansion that occurs so that the hub assumes a shape generally as shown in FIG. 4 due to centrifugal loading which will create a large compression at the rotor.

Low weight and high energy storage are important characteristics of this design. In space application, the costs to launch each pound is estimated at over $10,000.00. The weight reduction is achieved through the use of the expansion hub design coupled with the filament wound composite of the connecting disk and outer rotor. It is important that the ratio of the O.D. of the hub and the O.D. of the rotor be approximately with 2-to-1 to achieve optimum results.

The energy storage characteristics of the flywheel according to the present invention exploit the basic principals for maximizing kinetic energy of a spinning cylinder.

SPECIFIC ENERGY FORMULAE:

$E_k \rho \pi / 2 [R_o^4 - R^4] l \omega_m^2$ $m = \rho \pi [R_o^2 - R_i^2] l$ $\overline{E}_k = E_k / m$ $= \frac{1}{2} [R_o^2 + R_i^2] \omega_m^2$ $\overline{E}_k = \frac{1}{2} R_o^2 [1 + a^2] \omega_m^2$ WHERE:
ρ=mass density
$R_o$=outer radius of cylinder
$R_i$=inner radius of cylinder
l=axial length of cylinder
$\omega_m$=angular speed of cylinder
a=aspect ratio, $R_i/R_o$ The specific energy capacity of the flywheel is shown to increase with aspect ratio equally as with tip speed of the flywheel rotor. Due to hub-to-rotor interface stresses, the aspect ratio for graphite composite rotors is moderately small in order to minimize the radial stress at the interface. In the energy storage flywheel the compression created from the metal expansion hub creates a stress-free interface at an aspect ratio of a=0.8. The analysis indicates a peak specific energy above 140 watt hour/kilograms for the hub and rotor flywheel assembly at a 25" outer diameter rotor and a design speed of 35,000 rpm.

The teachings of the present invention can be realized with other embodiments of the hub. For example, the preferred cone angle α is approximately 45° but various other cone angles could be utilized approximately between 20° and 60°. The effect of reduced outer cone angle is to further increase axial interface load at interface 48, but with a corresponding increase in radial compression at the interface disk. The effect of increased inner cone angle is to also further increase axial interface load at the rotor/disk interface, but with a corresponding decrease in radial compression at the interface disk. Consequently, a preferred combination of inner and outer cone angles will generally be dictated by the type of joining required at the rotor/disk interface and the level of radial expansion desired at the interface disk, both dependent on specific diameters of rotor and disk as well as shaft speed.

The thickness of the material in the rim area will affect the expansion of the hub and thus the compression. A rim thickness of approximately ½" is preferred for most applications, although a range of thickness of between ⅜"

and 1" is considered acceptable and the thickness may be varied to tune the flywheel hub to achieve the desired compression consistent with the materials of construction.

Figure 06:
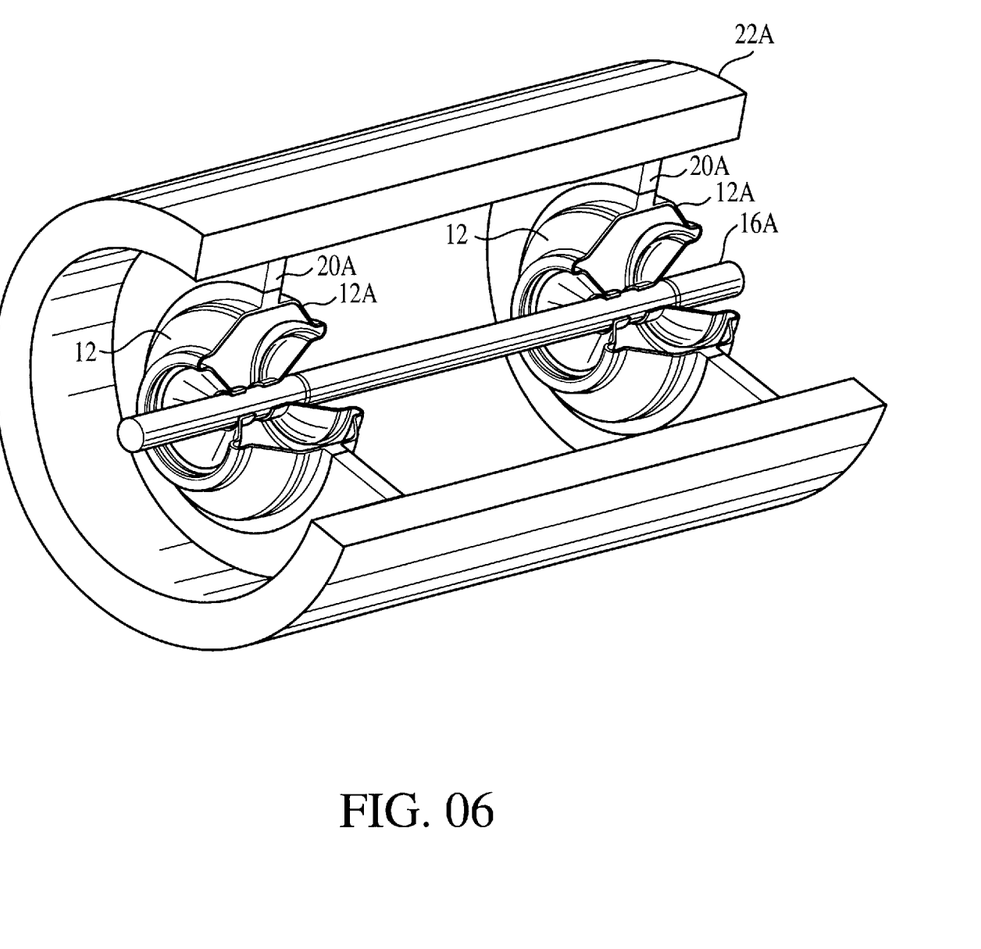

FIG. 6 shows an alternate embodiment of the invention in which multiple hubs, each comprised of sections 12, 12A are spaced apart and disposed along a shaft 16A and connect through interface disk 20A to an axially longer, cylindrical rotor 22A. In other respects, the hub sections, rims and rotor are as described above. The advantage of this construction is additional energy storage with lower weight penalty due to increased axial length of the rotor.

FIG. 8 shows the performance of the flexible hub of the present invention verses a rigid hub. It will be seen that with the rigid hub the bearing load continues to increase generally parabolicaly as the speed increases. However, with the flexible, expandable hub of the present invention, once the flywheel approaches critical resonance below the operational frequency range, self-balancing occurs which causes the bearing load to substantially drop to a very low, acceptable figure. The reduced rotor motion reduces loads on bearings and fatigue of the hub.

The expansion characteristics of this hub invention are achieved through the counteraction of opposing conical sections attached to concentric, circular rim 70 which acts as a "flex tube" or hinge located intermediate the shaft and rotor. The opposing centrifugal actions of the two conical sections mitigate the axial motion common with a single conical disk device (minimal net axial motion results from centrifugal loads) and combine to produce a high radial expansion with minimal "stretching" in the shells. In other words, as the inner and outer diameter conical shells expand under centrifugal loading, each will tend to "flatten" in opposing directions. The interface rim acts as a "hinge" that allows each conical section to flatten independently without the coupling of bending loads between the two shells. This decouples the axial motion of each conical shell allowing each to compensate for axial motion of the other. This means that high centrifugal expansion can be achieved with thicker sections for the flywheel hub and can result in higher stiffness which promotes rotordynamic stability. These sections are inclined at a conical angle and act in almost pure membrane stress to resist angular rotational shaft motions as opposed to reacting in almost pure bending as with "flexure" hubs. Expansion matching of the hub is achieved from the counteraction of the conical shells and the hinge action of the interface rims. Thick shells will have virtually no impact on centrifugal radial expansivity. This is a key advantage of the present hub structure in that pure membrane action is normally several orders of magnitude more stiff than pure bending. Typically with other "flexure hub" approaches, increase in resistance to angular nutation can be achieved only at a significant loss in centrifugal expansion capability of the hub and creates catastrophic radial stresses at the hub to rotor interface when placed in high speed applications. As the expansivity of the hub is intrinsic from the counteraction of the opposing conical disks and hinge of the interface rim, the hub is not a "flexure" hub as previously described by others but is a "self-expanding" compression locking device that can be "tuned" to provide a range of compression locking for a given diameter and shaft size. The tunability aspect cannot be accomplished in other "flexure" hub approaches.

In addition to the high expansion and rotordynamic stability of the present hub, another additional key advantage of the invention is the compact physical size of the hub as compared to other "flexure" hub approaches. Typically, high centrifugal expansivity is achieved through incorporation of large axial loops that provide the "flex" necessary to maintain the low tensile stresses at the hub to rotor interface. These axial loops contribute to hub size and can result in hub lengths that are several times larger than the diametrical dimension of the hub. Consequently, for very large diameter rotor to hub interfaces, these hub devices are impractical to package. As the centrifugal expansivity of the "dual cone" expansion hub relies solely upon intrinsic conical shell flattening to achieve large expansion characteristics, additional increases in axial dimension are unnecessary for larger diameter, higher speed flywheel interfaces. This means that very large diameter flywheels with short axial dimension can be developed that are extremely stable under rotordynamic imbalance effects.

The attenuation of the large radial stresses through the filament wound rotor allow a "stress free" interface to be developed at a discretionary diameter of the composite rotor. As the optimum specific energy (energy per unit mass) of cylindrical flywheel rotors occurs for a very thin hoop with a very large inner to outer diameter aspect ratio, this discretionary "stress free" interface allows very large diameters to be used for the rotor interface. This allows increased specific energy in the present flywheel over other approaches, generally as much as 50% more energy per pound of flywheel weight.

The high energy density characteristic of the flywheel energy storage module is achieved using a combination of high strength filament wound composite at the rotor rim in conjunction with a hinged dually-conical hub that eliminates the typical catastrophic radial tension stresses that fail conventional filament wound flywheel rotors. The double-cone expansion hub is intended to create a uniformly high compression stress at the composite inner wrap interface and combines with a variable mixture of hoop stiffness (e.g. ranging from low stiffness at the energy storage hub to moderate stiffness at the rotor rim outer diameter), thus alleviating the radial tensile stresses through the rim thickness that normally arise due to the extreme depth of the overall composite lay-up. The hub concept eliminates the hub-to-rotor interface failures typical in other concepts with a high compression "lock" at the disk interface joint due to hub compression.

Although the rim and interface disk components illustrated in FIGS. 1 and 2 can be fabricated from various types of material, composites of the type comprised of graphite fiber and cyanate matrix composites fabricated as described above are particularly suitable because of their good strength and out-gasing specifications. Carbon fiber and epoxy matrix composites also exhibit good strength-to-weight ratios but may be less desirable because of greater out-gasing. The shafts 16 and 16A are preferably formed of a high strength material such as steel or titanium.

EXAMPLE

In order to prove the effectiveness of the design, computer analysis was performed on a flywheel design constructed as shown in FIGS. 1 and 2. The hub was mounted on a 4130 hollow steel shaft having an outer diameter of 0.900" and an inner diameter of 0.620". Referring to FIG. 2, $R_1$=1.981", $D_1$=6.885. The axial length of the assembled hub was 5" and the radius $R_2$ of the tubular rim was 0.20". The material of the hub was a maraging 300 steel with the composition set forth above.

The interface disk was a multiple ply laminate of graphite fiber with an impregnated matrix. The fibers were arranged with an alternating axial and circumferential orientation (0/90 lay-up). The interface disk had an inner diameter of 7.9" and an outer diameter of 11.6". The inner diameter of the interface disk bonded to the outer surface of the hoop by epoxy bond.

The outer rotor or rim was 1–½" thick and an axial width or length of 7.0". It was wound circumferentially with graphite fiber.

The stress analysis assumed an operating speed range of 35.000 to 50,000 rpm. The calculated stress at the hub-to-shaft interface was 2000 psi. The calculated stress at the rim-to-hub interface was calculated as 11 ksi (compression) which are well within the safe stress levels of typical bonding materials.

Figure 07:
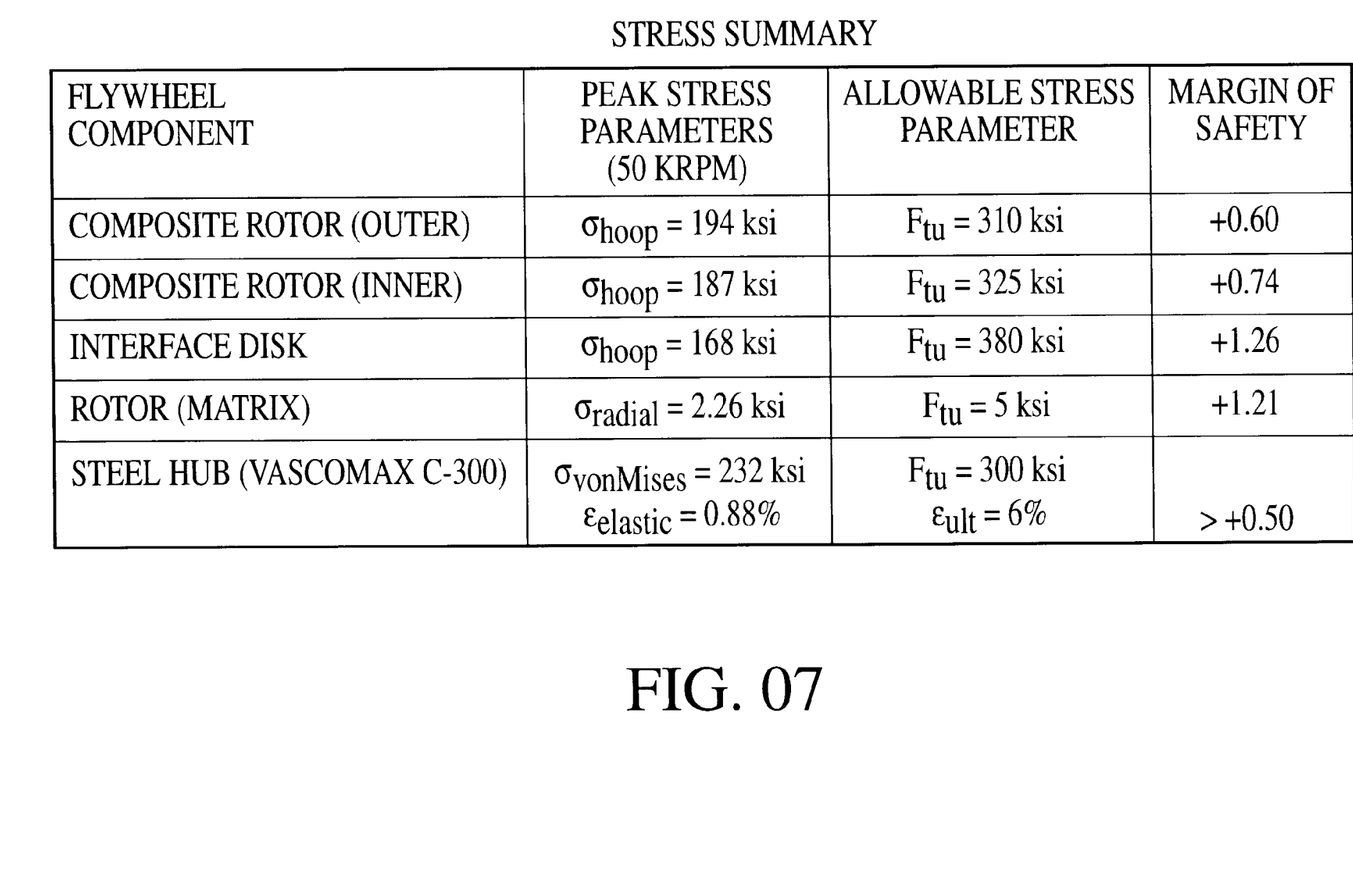

This compression propagates through the filament wound rotor thickness to minimize radial tension in the composite matrix, allowing very high rotor speeds with a simple filament wound manufacturing approach. This expansion compressing characteristic of the flywheel design is achieved through use of centrifugally tuned hinged conical hub components connecting the rotating energy storage rim to the rotating shaft. These compression hubs create a rate of expansion at the hub-ring outer radius that generates a high compression interface to the composite disk. The stress distribution of FIG. 5 illustrates the high compression at the hub/disk (disk I.D.) interface, and the degradation to a stress-free interface at the disk/rotor interface (rotor I.D.). This characteristic allows not only for very high rotational speeds but allows a simple bonded assembly process to be used at all the composite interface joints. The high expansion of the compression hub is demonstrated to minimize radial stresses in the flywheel filament wound rotor. Maximum radial stress in the filament wound matrix is below 3 ksi at 52.0 krpm, well below the allowable tension stress of 5 ksi determined from lot tests of flat-wise coupon samples. The predicted mechanical failure margins of safety for the flywheel are summarized in the stress summary of FIG. 7.

Intrinsic to this expansion hub approach also is a very beneficial "self balancing" characteristic that occurs at very low rotational speeds. The self-balancing feature tends to significantly minimize support structure and bearing loads that occur due to rotor imbalances. The optimum centrifugal compressing and self-balancing characteristics of the double-cone expansion hub are achieved as a result of extensive detailed stress and rotordynamics finite element analysis trade studies that initiate from a set of stiffness requirements obtained from closed form analytical approximations to the centrifugal stresses and critical "whirl" speeds of the rotating system. The fundamental critical speed (whirl resonance) of the flywheel is tuned by modifying the double-cone hub stiffness characteristics such that resonance is encountered at a benign (very low) rotational frequency, thus eliminating resonant whirl response at the higher operating speeds. The self-balancing feature of the flywheel hub invention is illustrated in the frequency response plot of FIG. 8 with rigid hub (non-flexible) response superimposed to demonstrate the attenuation with the hub invention. The results in FIG. 8 simulate rotordynamic response that results from eccentric imbalance in the flywheel rotor if the flywheel is allowed to dwell at each shaft rotational frequency until steady-state conditions are achieved.

In system operation, the flywheel is operated at a super critical speed, that is its operational speed is higher than the critical resonant speed. As the speed of the flywheel approaches one of the vibration modes, the vibration amplitude peaks at the critical speed and then decreases to a finite level as the flywheel speed is further increased. This finite level is minimized by the deformation of the hub which expands or flexes to allow the rotor center itself and rotates about its center of mass. Thus, the hub reduces stress and acts as a self-balancing device for the rotor at super critical speeds. The stress analysis indicates that a hub constructed according to the present invention to facilitate the attainment of angular speeds of up to 100 krpm, high energy storage, are greater than 10 kilowatt hours and high energy density greater than 140 watt hours per kilogram. In contrast, typical energy density of the state of the art battery is approximately 20 watt hours per kilogram.

While the principles of the invention have been made clear in the illustrative embodiments set forth above, it will be obvious to those skilled in the art to make various modifications to the structure, arrangement, proportion, elements, materials and components used in the practice of the invention. To the extent that these various modifications do not depart from the spirit and scope of the appended claims, they are intended to be encompassed therein.

I claim:

1. A low-weight, high energy storage flywheel coupled to a shaft for rotation about an axis of the shaft comprising:
   (a) an annular rotor of a composite material having outer and inner generally cylindrical surfaces;
   (b) a generally annular interface disk of a composite material disposed about said shaft and having an outer surface bonded to the inner surface of said rotor and having an inner, generally cylindrical surface;
   (c) a hub having oppositely disposed hub shell sections with respect to a vertical center line extending generally perpendicular to the shaft axis, each hub shell section having a coupling engaging the shaft, each said hub shell section having a first surface diverging generally radially outwardly at an acute angle with respect to the axis of rotation to a hinge having a generally semi-circular cross section which hinge extends generally concentrically about the axis of rotation of said flywheel, each hub section having a second surface converging toward said vertical center line from said hinge and terminating at a hoop radially spaced from said shaft axis; and
   (d) said hoop having an outer generally cylindrical surface secured to the inner surface of said interface disk whereby upon rotation at a predetermined speed the hub shell sections assume a generally flatter shape such that at least significant portions of said shell sections approach positions substantially perpendicular to said axis of rotation with an accompanying increase in radius to cooperate to provide substantially zero net axial motion of the hoop and substantially eliminate radial stress.

2. The flywheel of claim 1 wherein said acute angle is between 20° and 60°.

3. The flywheel of claim 1 wherein said hub shell sections are steel.

4. The flywheel of claim 1 wherein the ratio of the diameter of said hub to the outer diameter of said rotor is approximately 2-to-1.

5. The flywheel of claim 1 wherein said interface disk and said rotor comprise filament wound composite matrix structures.

6. The flywheel of claim 5 wherein said composite structures are graphite fiber and cyanate.

7. The flywheel of claim 5 wherein said structures include plies that are both circumferentially and axially applied.

8. A low-weight, high energy storage flywheel coupled to a shaft for rotation about an axis of the shaft comprising:

(a) an annular rotor of a composite material having outer and inner generally cylindrical surfaces; and (b) an interface disk of a composite material being generally annular and disposed about said shaft and having an outer surface bonded to the inner surface of said rotor and having an inner, generally cylindrical surface;

(c) a hub having oppositely disposed sections with respect to a vertical centerline extending generally perpendicular to the shaft axis, each hub section having a coupling engaging the shaft, each said hub section having:

(i) a first major generally conical shell being symmetrical about the axis of rotation and diverging generally radially outward at an acute angle from a hinge having a generally semi-circular cross section which hinge extends generally concentrically about the axis of rotation of said flywheel, said shell terminating at an outer flange that joins a hoop; and (ii) a second major conical shell being generally symmetrical about the axis of rotation and converging radially inward at a negative acute angle from said hinge and terminating at said coupling, said hub being so constructed and arranged that when rotated at a predetermined speed said conical shells assume a generally flatter shape such that at least significant portions of said first and second major conical shells approach positions substantially perpendicular to said axis of rotation with an accompanying increase in radius measured perpendicularly from the axis of rotation to the hoop, said first and second major conical shells having nearly equivalent oppositely acting motions parallel to the shaft axis that superimpose to provide substantially zero net axial motion of the hoop and substantially eliminating significant radial stresses;

(d) said hoop having an outer generally cylindrical surface secured to the inner surface of said composite interface disk, said hoop having an inner generally cylindrical surface the ratio of the diameter of said hoop surface to the diameter of said hoop outer cylindrical surface is so constructed and arranged that when rotated at a predetermined speed about the axis of rotation of said flywheel, said hoop will expand to a diameter substantially equivalent to the outermost radial position of said hub section outer flange after deformation of said first and second major conical shells under centrifugal loading;

(e) said semi-circular hinge being of sufficient flexibility that when said flywheel is rotated at a predetermined speed, relative angular rotations at the junction of said first and second major conical shells occur substantially eliminating resistance to the oppositely directed flattening behaviors of said first and second major conical shells; and (f) said composite interface disk having sufficient stiffness to create moderate radially compressive stresses at said hoop outer cylindrical surface and having an outer diameter dimension to create substantially zero radial stress at said annular rotor inner cylindrical surface.

9. A low weight, high energy storage flywheel coupled to a shaft for rotation about an axis of the shaft comprising:

(a) an annular rotor fabricated of a composite material having outer and inner generally cylindrical surfaces;

(b) an interface disk fabricated of a composite material being generally annular and disposed about said shaft and having an outer surface bonded to the inner surface of said rotor and having an inner, generally cylindrical surface;

(c) a hub having oppositely disposed hub shell sections with respect to a vertical center line extending generally perpendicular to the shaft axis and in abutting relationship, each hub shell section having a coupling engaging the shaft, a first surface diverging generally radially outwardly at an acute angle to a hinge having a generally semi-circular cross section which extends concentrically about the axis of rotation of said flywheel, a second surface converging toward said vertical center line from said hinge and terminating at a hoop, said first and second shell surfaces forming a double cone configuration; and (d) said hoop having an outer generally cylindrical surface secured to the inner surface of said interface disk whereby upon rotation of said shaft at a predetermined speed said hub shell sections will assume a generally flatter shape such that at least significant portions of said hub shell sections approach positions substantially perpendicular to said axis of rotation with an accompanying increase in radius to cooperate to provide substantially zero net axial motion of the hoop and substantially eliminate radial stress said.

10. The flywheel of claim 9 wherein said acute angle is between 20° and 60°.

11. The flywheel of claim 9 wherein said interface disk and said rotor comprise filament wound matrix structures.

12. A low-weight, high energy storage flywheel coupled to a shaft for rotation about the axis of the shaft comprising:

(a) an annular rotor of a composite material having outer and inner generally surfaces;

(b) an interface disk of a composite material being generally annular and disposed about said shaft and having an outer surface bonded to the inner surface of said rotor and having an inner, generally cylindrical surface;

(c) an expansion hub having oppositely disposed hub shell sections with respect to a vertical center line extending generally perpendicular to the shaft axis, each hub shell section having a coupling means engaging the shaft and having an outer generally conical surface extending to a hinge concentric about said axis and an inner conical wall extending from said hinge to said coupling means; and (d) said hub shell sections having an outer generally cylindrical surface secured to the inner surface of said interface disk whereby upon rotation, the hub sections flex at said hinge to flatten independently to expand to apply a compression force at the disk resulting in a substantially stress-free condition.

13. A low weight, high energy storage flywheel coupled to a shaft for rotation about an axis of the shaft comprising:

(a) a generally cylindrical annular rotor of a composite material having outer and inner generally cylindrical surfaces;

(b) at least two interface disks of a composite material each being generally annular and disposed about said shaft at spaced apart locations and each having an outer surface bonded to the inner surface of said rotor and each having an inner, generally cylindrical surface;

(c) a hub associated with each interface disk, each hub having oppositely disposed shell sections with respect to a vertical center line extending generally perpendicular to the shaft axis, each said hub shell section having a coupling means engaging the shaft and being concentric about said shaft, and said oppositely disposed shell sections each having a first surface diverging generally radially outwardly at an acute angle with respect to the shaft axis to a hinge having a substantially semi-circular cross-section, a second surface converging toward said vertical center line from said hinge and terminating at a hoop radially spaced from said shaft axis; and (d) said hoop having an outer generally cylindrical surface secured to the inner surface of said interface disk whereby upon rotation at a predetermined speed the hub sections assume a generally flatter shape such that at least significant portions of said hub shell sections approach positions substantially perpendicular to said axis of rotation with an accompanying increase in radius to cooperate to provide substantially zero net axial motion of the hoop and substantially eliminate radial stress.

* * * * *